United States Patent
Adams

(10) Patent No.: US 9,710,362 B2
(45) Date of Patent: Jul. 18, 2017

(54) EVALUATING USER INTERFACE USABILITY FOR TASK COMPLETION

(71) Applicant: International Business Machines Corporation, Armonk, NY (US)

(72) Inventor: Tina M. Adams, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 14/753,352

(22) Filed: Jun. 29, 2015

(65) Prior Publication Data

US 2016/0378642 A1 Dec. 29, 2016

(51) Int. Cl.
*G06F 3/048* (2013.01)
*G06F 11/36* (2006.01)
*G06F 3/0482* (2013.01)
*G06F 3/0484* (2013.01)
*G06F 9/44* (2006.01)
*G06F 3/0481* (2013.01)

(52) U.S. Cl.
CPC ........ *G06F 11/3664* (2013.01); *G06F 3/0482* (2013.01); *G06F 3/04842* (2013.01); *G06F 3/0481* (2013.01); *G06F 8/34* (2013.01); *G06F 8/38* (2013.01); *G06F 2203/04803* (2013.01)

(58) Field of Classification Search
CPC ........ G06F 11/34–11/3452; G06F 8/34; G06F 8/38; G06F 3/0481; G06F 2203/04803
See application file for complete search history.

(56) References Cited

U.S. PATENT DOCUMENTS

| 6,404,443 B1 | 6/2002 | Westerman |
| 8,060,222 B2 * | 11/2011 | Eldridge ................ G05B 15/02 |
| | | 715/763 |
| 8,554,792 B1 * | 10/2013 | Ahmed ............. G06F 17/30905 |
| | | 455/432.1 |

(Continued)

OTHER PUBLICATIONS

Patrick Lynch and Sarah Horton, Web Style Guide 3rd Edition, [Online] 2009, [Retrieved from the Internet] <http://webstyleguide.com/wsg3/6-page-structure/3-site-design.html> 7 pages total.*

(Continued)

*Primary Examiner* — Thuy Dao
*Assistant Examiner* — Hanh T Bui
(74) *Attorney, Agent, or Firm* — Reza Sarbakhsh; SVL IPLaw Edell, Shapiro & Finnan, LLC

(57) ABSTRACT

According to one embodiment of the present invention, a system for tracking and presenting states of a user interface includes at least one processor. The at least one processor may be configured to track the visibility and usage of each of a plurality of areas of a user interface. The processor may be further configured to determine the navigation sequence through the plurality of areas of the user interface when utilized to complete a task. The processor may be configured to graphically present the visibility, usage, and determined navigation sequences on a display that includes a layout of the user interface, where the graphical presentation of the visibility, usage, and determined navigation sequences may be displayed within their corresponding areas of the layout of the user interface.

17 Claims, 8 Drawing Sheets

(56) References Cited

U.S. PATENT DOCUMENTS

| | | | | |
|---|---|---|---|---|
| 8,924,942 | B1* | 12/2014 | Makuch | G06F 9/44 715/762 |
| 8,930,818 | B2* | 1/2015 | Cordasco | G06F 11/328 715/704 |
| 2006/0218510 | A1* | 9/2006 | Ward | G06Q 10/06 715/853 |
| 2006/0250358 | A1 | 11/2006 | Wroblewski | |
| 2009/0254313 | A1* | 10/2009 | Armour | G06F 11/3423 702/187 |
| 2010/0251128 | A1* | 9/2010 | Cordasco | G06F 11/328 715/736 |
| 2012/0079400 | A1 | 3/2012 | Nauerz et al. | |
| 2012/0236143 | A1* | 9/2012 | Weatherhead | H04H 60/45 348/135 |

OTHER PUBLICATIONS

Working with percentages, [Online] 2009, Student Learning Development, University of Leicester, [Retrieved from the Internet] <http://www2.le.ac.uk/offices/ld/resources/study-guides-pdfs/numeracy-skills-pdfs/Working%20with%20percentages.pdf> 4 pages total.*

Lorenzo Lucignano et al., My Hands or my Mouse: Comparing a Tangible and Graphical User Interface using Eye-Tracking Data, ACM 2014, retrieved online on Mar. 1, 2017, pp. 1-8. Retrieved from the Internet: <URL: http://dualt. epfl.ch/files/content/sites/chili/files/files/myHandmyMouse.pdf>.*

Anonymously; "Television Inventions for Improved User Interface and Improved Display"; An IP.com Prior Art Database Technical Disclosure; http://ip.com/IPCOM/000226980; Apr. 29, 2013.

Anonymously; "Speed-based auto-switch method for Graphical User Interface and Touch Controls"; An IP.com Prior Art Database Technical Disclosure; http://ip.com/IPCOM1000232636; Nov. 22, 2013.

IBM; "Method for Dynamic Generation of Software Application Navigation Flows for Usability"; An IP.com Prior Art Database Technical Disclosure; http://ip.com/IPCOM/000192684; Jan. 28, 2010.

* cited by examiner

US 9,710,362 B2

EVALUATING USER INTERFACE USABILITY FOR TASK COMPLETION

BACKGROUND

Present invention embodiments relate to evaluating a user interface's usability for task completion, and more specifically, to tracking users' frequency of use, residency, and click flow path within a user interface for analyzing the usability of the user interface for completing designated tasks.

User interfaces present information to users via various areas, panes, or windows within the user interface. Certain areas of a user interface are always displayed, while other areas are only displayed when prompted or activated by a user utilizing the user interface. Different areas often present and display different information. User interfaces may also display various buttons, switches, or icons that are selectable by users utilizing the user interface. The combination of the buttons with the areas of the user interface enables a user to perform and complete tasks with the user interface.

However, the design of a user interface may not be optimized for users to efficiently complete the intended tasks for which the user interface was originally designed. Some user interfaces may present a large portion of the display with an area that is rarely utilized or does not provide useful information. Other user interfaces may require several steps to be performed by a user to display areas or buttons that are useful for completing a task, where these areas or buttons should be displayed more easily or more frequently. User interfaces may be optimized so that tasks may be completed by users in a more time efficient and effective manner.

SUMMARY

According to one embodiment of the present invention, a system for tracking and presenting states of a user interface includes at least one processor. The at least one processor may be configured to track the visibility and usage of each of a plurality of areas of a user interface. The processor may also be configured to determine one or more navigation sequences through the plurality of areas based on usage of the user interface, where the navigation sequences are performed to complete a task with the user interface. Finally, the processor may be configured to graphically present the visibility, usage, and determined navigation sequences on a display that includes a layout of the user interface, where the graphical presentation of the visibility, usage, and determined navigation sequences may be displayed within the corresponding areas of the layout of the user interface.

Furthermore, the processor of the system may determine the visibility as a first percentage of time each corresponding area is visible, and determine the usage as a second percentage of time each corresponding area is in use. The processor may also determine the visibility as an amount of time each corresponding area is visible, and determine the usages as an amount of time each corresponding area is in use. The processor may then display graphical objects that indicate the amount of time for the visibility of each corresponding area and the amount of time for the usage of each corresponding area. In addition, the processor may display connections between the graphical objects to form a connected graph of the plurality of areas, where the connections between the graphical objects may indicate the navigation sequence of the user interface.

BRIEF DESCRIPTION OF THE DRAWINGS

Generally, like reference numerals in the various figures are utilized to designate like components.

DETAILED DESCRIPTION

Figure 1:
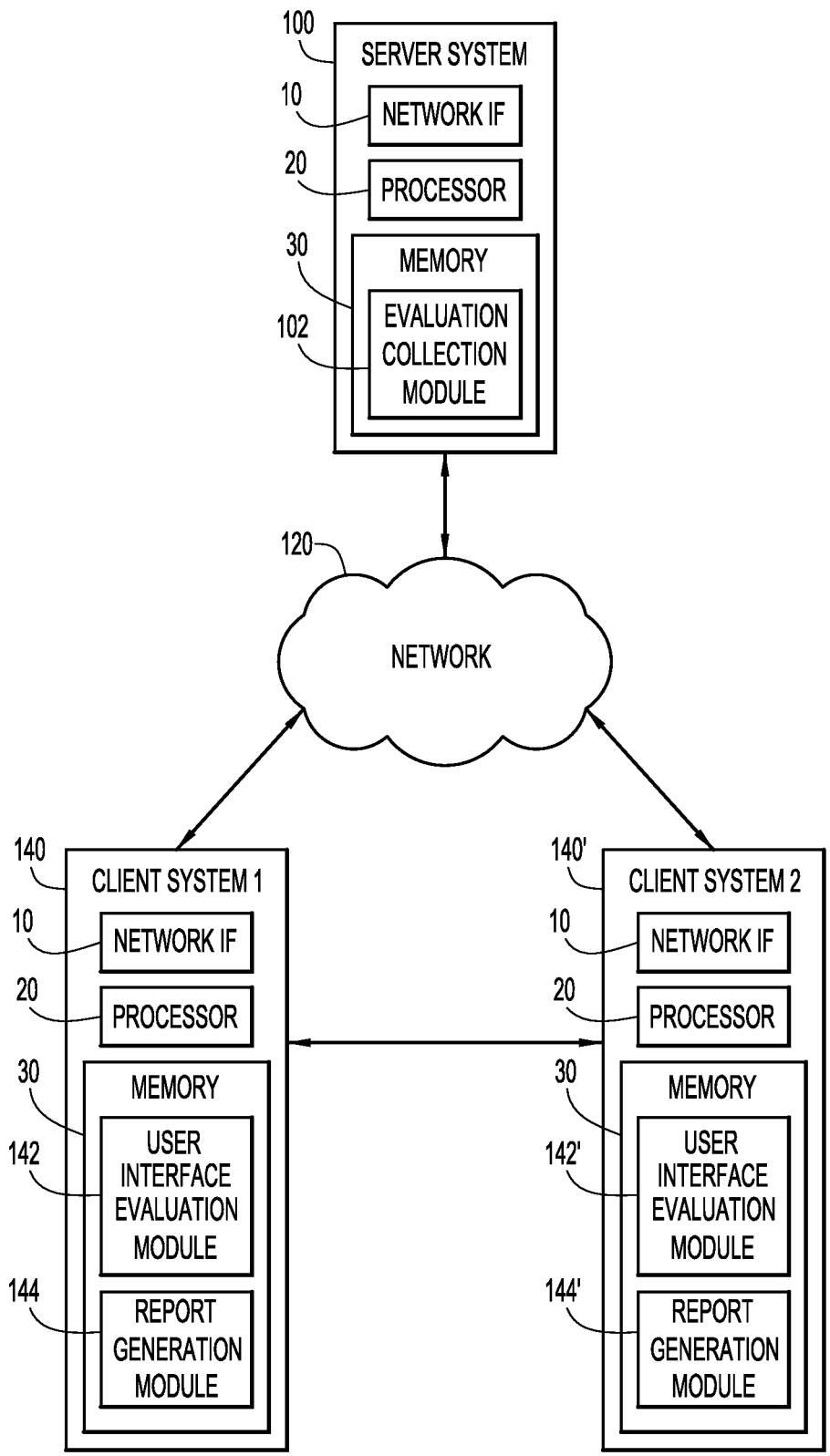
FIG. 1 is a diagrammatic illustration of an example of a computing environment for use with an embodiment of the present invention.

The present invention embodiments pertain to a system and method for tracking and presenting states of a user interface to evaluate the user interface for its efficiency in completing a task. The system may track the visibility and usage of each of a plurality of areas or panels during the time it takes for a test user to complete a designated task with the user interface. The system may determine the visibility of each of the areas of the user interface as a first percentage of time each of the areas is visible during the time it takes a test user to complete the designated task using the user interface. Moreover, the system may also determine the usage of each of the areas of the user interface as second percentage of time each area is used during the time it takes for a test user to complete the designated task using the user interface. The system may further determine the navigation sequences a test user had taken within the user interface to complete the designated task with a user interface. The system may further generate a report of the efficiency and usefulness of the user interface, where the report may include a graphical presentation of the visibility of each of the areas, the usage of each of the areas, and the navigation sequence displayed over the layout of the user interface.

The designers, developers, and/or programmers of a user interface may not be the end user of the user interface. Thus, the designer/developer/programmer of the user interface may understand the tasks that may need to be completed with the user interface, but may not have a full understanding of the manner in which these tasks will be completed, or the steps taken by an end user to complete the task with the designed user interface. The present invention provides a system that can be utilized during, and after, the design/development of a user interface. The present invention embodiment may monitor a user interface while a test user utilizes the user interface to complete a designated task, where the present invention embodiment is configured to track the visibility and usage of each of the areas of the user interface during the completion of the task, as well as the navigation sequence the test user establishes to complete the task. The present invention embodiment may be used to monitor any number of test users to complete the same designated task, where the results from each test user's session are tracked and recorded. The present invention embodiment may then collect and compile all of the evaluations from each of the test users monitored, where the compiled data is then analyzed to determine any discrepancies between the amount of time each area of the user interface was visible and the amount of time each area of the user interface was actively used during the completion of the assigned task.

The present invention embodiments may generate reports that indicate the efficiency and usefulness of the user interface for completing the designated task. The generated reports may display the amount of time taken to complete the designated task, the navigation sequence taken by users to complete the designated task, as well as any large discrepancies between the visibility and usage of each of the areas of the user interface. The generated report may be used by the designers/developers/programmers of the user interface to modify the setup, layout, and operation of the user interface. More specifically, designers/developers/programmers may modify the user interface to eliminate or reduce the amount of discrepancies that were identified by the present invention embodiment. The designers/developers/programmers may also utilize the generated reports to streamline the navigation sequences taken by users to complete the designated task.

An example environment for use with present invention embodiments is illustrated in FIG. 1. Specifically, the environment includes one or more server systems 100, and one or more client or end-user systems 140, 140'. Server systems 100 and client systems 140, 140' may be remote from each other and communicate over a network 120. The network 120 may be implemented by any number of any suitable communications media (e.g., wide area network (WAN), local area network (LAN), Internet, Intranet, etc.). Alternatively, server systems 100 and client systems 140, 140' may be local to each other, and communicate via any appropriate local communication medium (e.g., local area network (LAN), hardwire, wireless link. Intranet, etc.).

Server systems 100 and client systems 140, 140' may be implemented by any conventional or other computer systems preferably equipped with a display or monitor, a base (e.g., including at least one processor 20, one or more memories 30 and/or internal or external network interfaces or communications devices 10 (e.g., modem, network cards, etc.)), optional input devices (e.g., a keyboard, mouse or other input device), and any commercially available and custom software (e.g., server/communications software, user interface evaluation module, evaluation collection module, report generation module, browser/interface software, etc.).

Client systems 140, 140' enable users to establish communication links via communication channels (e.g., email, SMS/text messaging, tweeting, instant messaging, audio calls, video chats, etc.) with other client systems 140, 140' and/or the server system 100. The client systems 140, 140' may include a user interface evaluation module 142, 142' that tracks and monitors a user interface of the client systems 140, 140' and a report generation module 144, 144' that generates a report of the evaluation of a user interface. When the user interface module 142, 142' is used to evaluate a user interface of the client systems 140, 140', the user interface evaluation module 142, 142' tracks and monitors a test user's interaction and use of a user interface to complete a designated task. The user interface evaluation module 142, 142' tracks a test user's click path and click flow, and monitors the frequency of each area of the user interface is used and the time that each area of the user interface is being displayed. Moreover, the user interface evaluation module 142, 142' may further monitor the navigation sequence of a test user utilizing the user interface to complete a designated task. The server system 100 may include an evaluation collection module 102 to collect the user interface evaluations from a plurality of client systems 140, 140'.

Modules 102, 142, 142', 144, 144' may include one or more modules or units to perform the various functions of present invention embodiments described below. The various modules (e.g., user interface evaluation module, report generation module, and evaluation collection module, etc.) may be implemented by any combination of any quantity of software and/or hardware modules or units, and may reside within memory 30 of the server 100 and/or client systems 140, 140' for execution by processor 20.

In the environment illustrated in FIG. 1, the user interface evaluation module 142, 142' of the client systems 140, 140' monitors user interfaces that are installed on the client system 140, 140' on which the user interface evaluation module 142, 142' is also installed. The user interface evaluation module monitors and tracks a user interface as it is used by a test user to complete a designated task. Once a user interface has been monitored and evaluated for the completion of a designated task, each of the client systems 140, 140' send to the server system 100 the evaluation of the user interface. The evaluation collection module 102 of the server system 100 compiles all of the user interface evaluations from each of the client systems 140, 140'. The server system 100 may then send the compiled evaluations of the completion of a designated task with the user interface to the first client system 140, or to all of the client systems 140, 140'. The report generation module 144, 144' then uses the compiled user interface evaluations to create or generate a report for the completion of the designated task using the user interface installed on the client systems 140, 140'. The generated reports may display the effectiveness or efficiency of the user interface in completing the designated task. The test users of the client systems 140, 140' can analyze the generated reports to determine if or where the user interface may need to be altered or changed to be more effective and/or efficient in performing the designated task.

Figure 2:
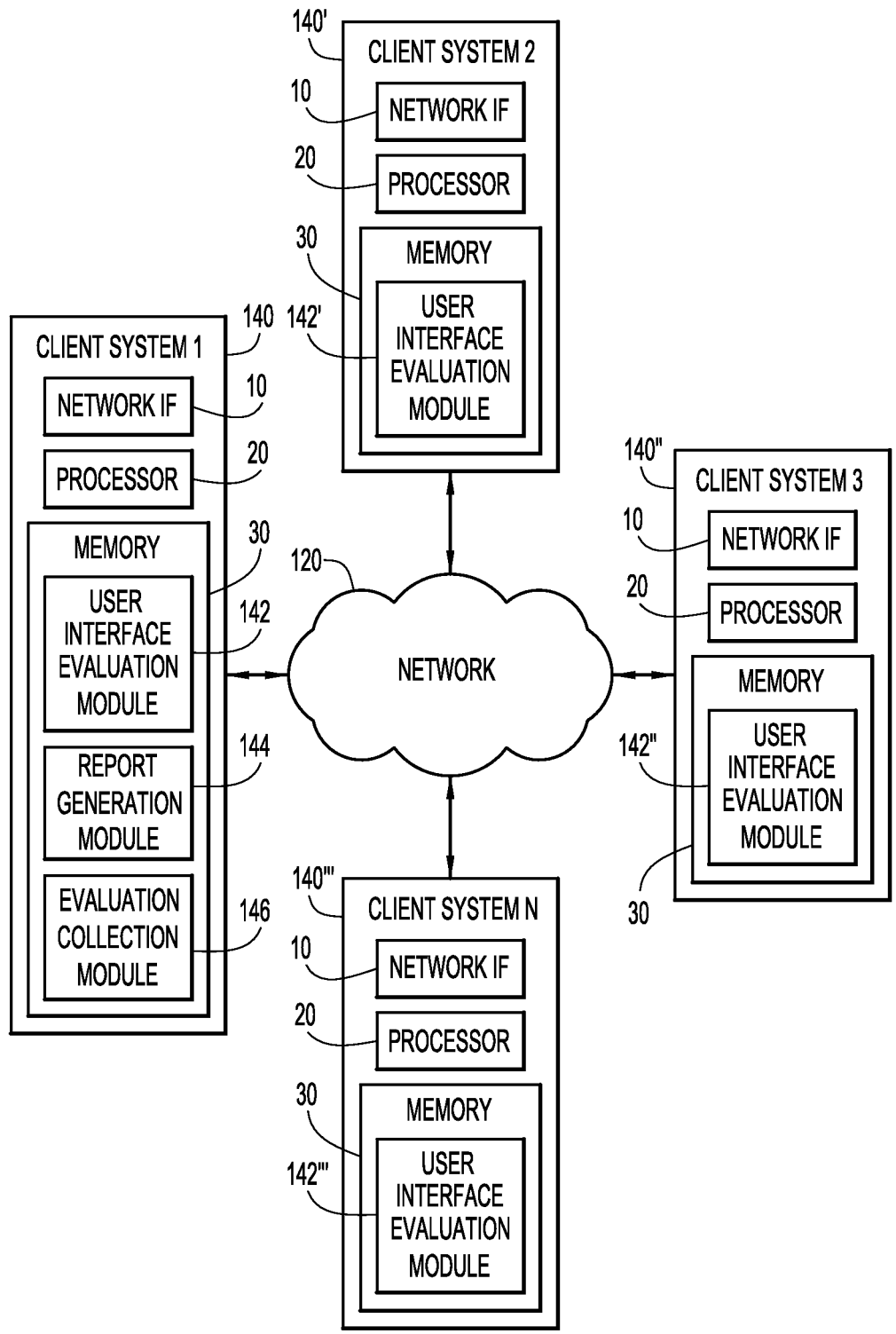
FIG. 2 is a diagrammatic illustration of a second example of a computing environment for use with an embodiment of the present invention.

A second example environment for use with present invention embodiments is illustrated in FIG. 2. Similarly to the first example illustrated in FIG. 1, the environment includes two or more client or end-user systems 140, 140', 140", 140''', but does not include the server system 100. Each of the client systems 140, 140', 140", 140''' communicate with one another via a network 120. Each one of the client systems 140, 140', 140", 140''' includes a user interface evaluation module 142, 142', 142", 142'''. As explained previously, the user interface evaluation module 142, 142', 142", 142''' of a client system 140, 140', 140", 140''' monitors user interfaces that are installed on the client systems 140, 140', 140", 140''' on which the user interface evaluation module 142, 142', 142", 142'" is also installed. More specifically, the user interface evaluation modules 142, 142', 142", 142'" monitor the user interfaces installed on the client systems 140, 140', 140", 140'" as the user interfaces are utilized by test users of the client systems 140, 140', 140", 140'" to complete a designated task. The first client system 140, however, also includes a report generation module 144 and an evaluation collection module 146. As previously explained, the evaluation collection module 146 of the first client system 140 compiles all of the user interface evaluations from each of the client systems 140, 140', 140", 140'". The report generation module 144 then uses the compiled user interface evaluations to create or generate a report for the completion of the designated task using the user interface installed on the client systems 140, 140', 140", 140'". The generated reports may display the effectiveness, efficiency, and/or usability of the user interface in completing a designated task. The designers of the user interface on the client systems 140, 140' can analyze the generated reports to determine if or where a user interface may need to be altered or changed to be more effective and/or efficient in performing the designated task.

Figure 3:
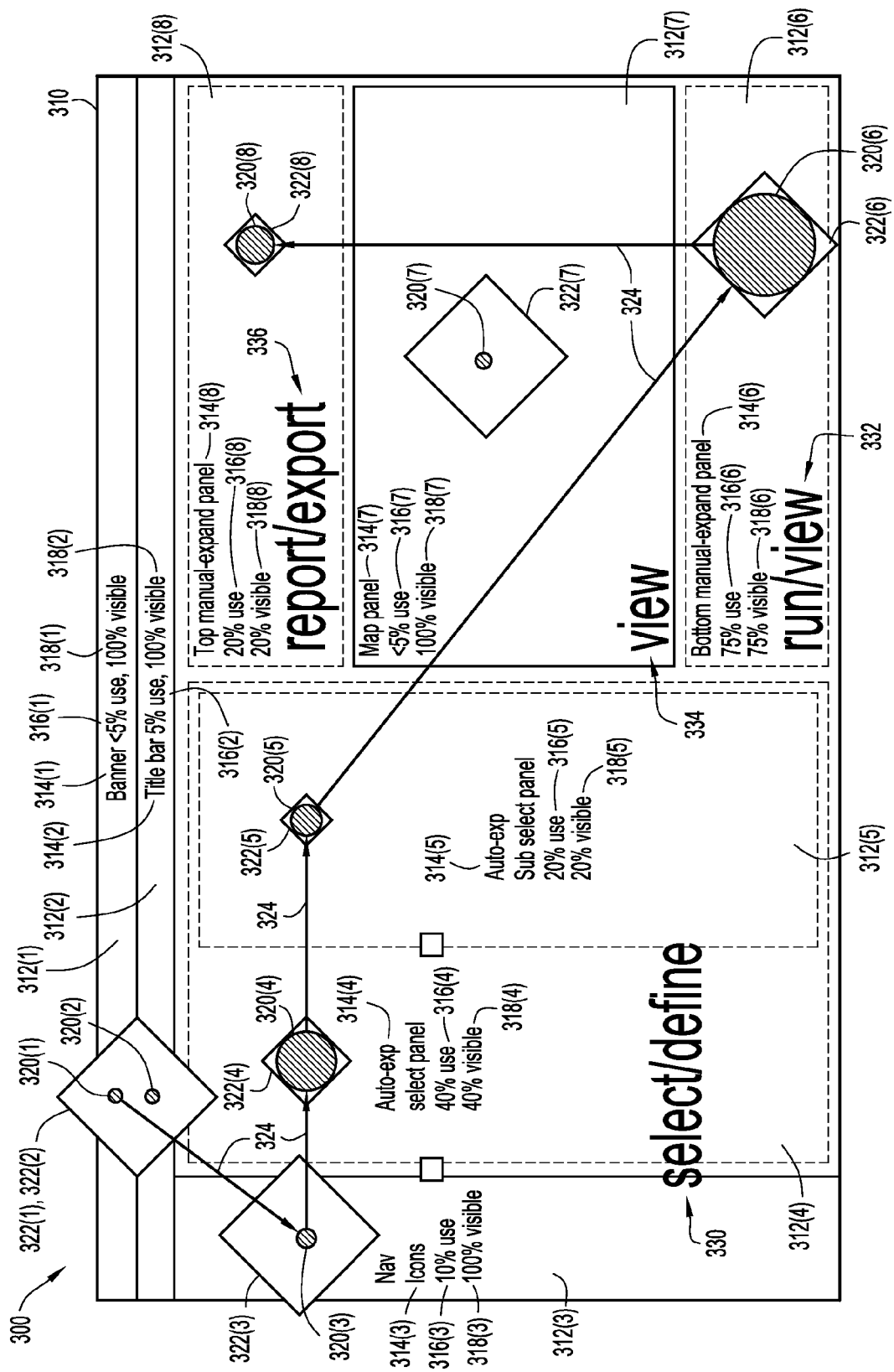
FIG. 3 is an example of a heuristic evaluation diagram of a user interface that displays the task flow and the percentage of time each portion of the user interface is visible during the time taken to complete a task with the user interface in accordance with an embodiment of the present invention.

FIG. 3 illustrates an example of a heuristic evaluation diagram 300 for an example user interface 310. As illustrated in FIG. 3, the user interface 310 contains a plurality of areas, panels, or frames, 312(1)-312(8), where each area 312(1)-312(8) may be different from another area 312(1)-312(8) in size, shape, and content. Each of the areas 312(1)-312(8) of the user interface 310 may have a title, or name, 314(1)-314(8) for what each area 312(1)-312(8) represents in the user interface 310. While FIG. 3 illustrates a user interface 310, the user interface 310 illustrated is merely an example of a user interface, where another user interface may include more or less areas, and the areas may be oriented in different positions and may be of different sizes. As illustrated in FIG. 3, the top of the user interface 310 includes an area 312(1) spanning the width of the user interface 310, but being relatively short in height. The first area 312(1) may be labeled "Banner" 314(1), which may contain a logo, global navigation controls, and/or tools for operating the user interface 310. Directly below the first area 312(1) is a second area 312(2) that may be labeled "Title Bar" 314(2). The second area 312(2) is substantially similar in size and shape to the first area 312(1), and may be disposed directly below the first area 312(1). The second area 312(2) may contain the name of the user interface 310.

Further illustrated in FIG. 3 are third, fourth, and fifth areas 312(3)-312(5). The third area 312(3) may be substantially rectangular in shape and may be disposed along the left side of the user interface 310, where the third area 312(3) may span the length of the user interface 310 from the bottom of the second area 312(2) to the bottom of the user interface 310. The third area 312(3) may be labeled "Nav Icons" or "Navigation Icons" 314(3), and may contain a series of navigation icons for operating the user interface 310. The fourth area 312(4) may be disposed directly to the right of the third area 312(3). As illustrated in FIG. 3, the fourth area 312(4) is defined by a dotted or dashed lines, which represents that that fourth area 312(4) may be a sub area, or sub panel, of another area. The dotted or dashed lines may further indicate that the fourth area 312(4) may not be displayed all of the time. As illustrated in FIG. 3, the fourth area 312(4) is a sub area of the third area 312(3), where the fourth area 312(4) is labeled "Auto-exp select panel" 314(4). This labeling may be an abbreviation for automatic expanding selection panel, which may signify that the fourth area 312(4) is an area that automatically expands from the third area 312(3) when an item is selected or hovered over within the third area 312(3). Moreover, the fifth area 312(5) is also defined by a dotted or dashed line, which represents that that fifth area 312(5) is a sub area of the fourth area 312(4). The fifth area 312(5), as illustrated, may be disposed within, and on the right side of, the fourth area 312(4). Furthermore, the fifth area 312(5) may be labeled "Auto-exp Sub select panel" 314(5), which may be an abbreviation for automatic expanding sub-selection panel. Thus, the fifth area 312(5) may be an area that automatically expands from the fourth area 312(4) when an item is selected or hovered over within the fourth area 312(4).

Continuing with FIG. 3, on the right side of the user interface 310 is the sixth, seventh, and eighth areas 312(6)-312(8) of the user interface 310. Disposed within the bottom right corner of the user interface 310 may be the sixth area 312(6), while disposed within the top right corner of the user interface 310, directly below the second area 312(2), may be the eighth area 312(8). Furthermore, disposed between the sixth area 312(6) and the eighth area 312(8) may be the seventh area 312(7). As illustrated in the example of the user interface 310 of FIG. 3, the sixth area 312(6) and the eighth area 312(8) are of nearly equivalent size, while the seventh area 312(7) is larger than both the sixth and eighth areas 312(6), 312(8). Furthermore, both the sixth and the eighth areas 312(6), 312(8) are defined by dotted or dashed lines, which may represent that that sixth and eighth areas 312(6), 312(8) are not visible at all times that the user interface 310 is running. The sixth area 312(6) may be labeled "Bottom manual-expand panel" 314(6) which may be an abbreviation for bottom manually expanding panel. Similarly, the eighth area 312(8) may be labeled "Top manual-expand panel" 314(8), which may be an abbreviation for top manually expanding panel. Thus, the sixth and eighth areas 312(6), 312(8) are areas that must be manually expanded to be visible within the user interface 310. Moreover, the seventh area 312(7) is defined by a solid line, meaning that the seventh area 312(7) may be visible at all times, and is not an area that is an expansion of another area. The seventh area 312(7) may be labeled "Map panel" 312(7), and may contain a map displayed within the area 312(7).

As further illustrated in FIG. 3, each area 312(1)-312(8) contains a first percentage 316(1)-316(8) and a second percentage 318(1)-318(8). The first percentage 316(1)-316(8) may represent the percentage that the respective specific area 312(1)-312(8) was used during the time period the user interface 310 was utilized to perform a designated task. The second percentage 318(1)-318(8) may represent the percentage of time that the respective specific area 312(1)-312(8) was visible within the user interface 310 during the time span the user interface 310 was utilized to perform a designated task. Moreover, FIG. 3 further includes graphical representations of the first percentage 316(1)-316(8) and the second percentage 318(1)-318(8) for each of the areas 312(1)-312(8). The first percentage 316(1)-316(8) for each area 312(1)-312(8) may be represented by a circle 320(1)-320(8), where the size of the circle 320(1)-320(8) for each area 312(1)-312(8) is relative to the value of the first percentage 316(1)-316(8). The second percentage 318(1)-318(8) may be represented by a diamond or square 322(1)-322(8), where the size of the diamond or square 322(1)-322(8) for each area 312(1)-312(8) is relative to the value of the second percentage 318(1)-318(8). The circle 320(1)-320(8) for each area 312(1)-312(8) may be disposed within the diamond 322(1)-322(8) for each area 312(1)-312(8), so that discrepancies between the size of the circle 320(1)-320(8)

and the size of the diamond 322(1)-322(8) may be easily identified. Discrepancies between the size of the circle 320(1)-320(8) and the size of the diamond 322(1)-322(8) further represent discrepancies between amount of use an area 312(1)-312(8) received and the amount of time the area 312(1)-312(8) was visible when the user interface 310 was used to complete a designated task.

Thus, as illustrated in FIG. 3, large discrepancies exist in four areas 312(1), 312(2), 312(3), 312(7). The first and second areas 312(1), 312(2) have large discrepancies between their circle 320(1), 320(2) and their diamonds 322(1), 322(2) because, during the completion of the designated task, the first and second areas 312(1), 312(2) are visible 100% of the time, as indicated by their second percentages 318(1), 318(2), but the first area 312(1) is used less than 5% of the time, as indicated by its first percentage 316(1), and the second area 312(2) is used approximately 5% of the time, as indicated by its first percentage 316(2). Moreover, the third area 312(3) has large discrepancies between its circle 320(3) and its diamond 322(3) because the third area 312(3) is visible 100% of the time, as indicated by its second percentages 318(3), but is used approximately 10% of the time, as indicated by its first percentage 316(3), during the completion of the designated task. Finally, the seventh area 312(7) has large discrepancies between its circle 320(7) and its diamond 322(7) because the seventh area 312(7) was visible 100% of the time, as indicated by its second percentage 318(7), but was used less than 5% of the time, as indicated by its first percentage 316(7), during the completion of the designated task.

Further illustrated in FIG. 3, the circles 320(4), 320(5), 320(6), 320(8) of the fourth, fifth, sixth, and eighth areas 312(4), 312(5), 312(6), 312(8) are substantially equal in size with the respective diamonds 322(4), 322(5), 322(6), 322(8). Thus, the fourth area 312(4) has a circle 320(4) and a diamond 322(4) of substantially equal size because the fourth area 312(4) was visible 40% of the time, as indicated by its second percentage 318(4), and was used 40% of the time, as indicated by its first percentage 316(4), during the completion of the designated task. The fifth and eighth areas 312(5), 312(8) have circles 320(5), 320(8) and diamonds 322(5), 322(8) of substantially equal size because the fifth and eighth areas 312(5), 312(8) were visible 20% of the time, as indicated by their second percentages 318(5), 318 (8), and were used 20% of the time, as indicated by their first percentages 316(5), 316(8), during the completion of the designated task. The sixth area 312(6) has a circle 320(6) and a diamond 322(6) of substantially equal size because the sixth area 312(6) was visible 75% of the time, as indicated by its second percentage 318(6), and was used 75% of the time, as indicated by its first percentage 316(4), during the completion of the designated task.

The circles 320(4), 320(5), 320(6), 320(8) of the fourth, fifth, sixth, and eighth areas 312(4), 312(5), 312(6), 312(8) are significantly larger than the circles 320(1), 320(2), 320(3), 320(7) of the first, second, third, and seventh areas 312(1), 312(2), 312(3), 312(7) because the fourth, fifth, sixth, and eighth areas 312(4), 312(5), 312(6), 312(8) were all used more during the completion of the designated task than the first, second, third, and seventh areas 312(1), 312(2), 312(3), 312(7). As illustrated in FIG. 3, the sixth area 312(6) contains the largest circle 320(6) because the sixth area 312(6) was used the most (75%) during the completion of the designated task. Conversely, the first and seventh areas 312(1), 312(7) contain the smallest circles 320(1), 320(7) because the first and seventh areas 312(1), 312(7) were used the least (<5%) during the completion of the designated task. Furthermore, the diamonds 322(4), 322(5), 322(6), 322(8) of the fourth, fifth, sixth, and eighth areas 312(4), 312(5), 312(6), 312(8) are smaller in size than the diamonds 322(1), 322(2), 322(3), 322(7) of the first, second, third, and seventh areas 312(1), 312(2), 312(3), 312(7) because the fourth, fifth, sixth, and eighth areas 312(4), 312(5), 312(6), 312(8) are visible for a smaller amount of time than the first, second, third, and seventh areas 312(1), 312(2), 312(3), 312(7) during the completion of the designated task. As further illustrated in FIG. 3, the first, second, third, and seventh areas 312(1), 312(2), 312(3), 312(7) contain the largest diamonds 322(1), 322(2), 322(3), 322(7) because the first, second, third, and seventh areas 312(1), 312(2), 312(3), 312(7) were visible for the most amount of time (100%) of the time during the completion of the designated task. Conversely, the fifth and eighth areas 312(5), 312(8) contain the smallest diamonds 322(5), 322(8) because the fifth and eighth areas 312(5), 312(8) were visible for the least amount of time (20%) during the completion of the designated task.

Further illustrated in FIG. 3 is a navigation sequence path designated by arrows 324. As indicated by the set of arrows 324, a test user using the user interface 310 to complete a designated task started with the first and second areas 312(1), 312(2), and moved to the third area 312(3). From the third area 312(3), the user using the user interface 310 moved on to the fourth area 312(4) and then to the fifth area 312(5). The test user using the user interface 310 to complete the designated task moved from the fifth area 312(5) to the sixth area 312(6) and then to the eighth area 312(8). The test user skipped over and didn't use the seventh area 312(7). The arrows 324 connect the circles 320(1)-320(8) and the diamonds 322(1)-322(8) of the areas 312(1)-312(8) to designate the navigation sequence of the test user.

Additionally, FIG. 3 illustrates that the heuristic evaluation diagram 300 includes text sections 330, 332, 334, 336 that may define groups of the areas 312(1)-312(8) by their performance or function in completing the designated task. As illustrated, the third, fourth, and fifth areas 312(3), 312(4), 312(5) are labeled with the text "select/define" 330 because the third, fourth, and fifth areas 312(3), 312(4), 312(5) may present items or icons in their respective areas that are selectable. The sixth area 312(6) may be labeled with the text "run/view" 332 because the sixth area 312(6) may contain items, icons, or prompts for the user of the user interface 310 to run a scenario or another program and may present information that is to be viewed by the user. The seventh area 312(7) may be labeled with the text "view" 334 because the seventh area 312(7) may contain or present information that is to be viewed by the user. Finally, the eighth area 312(7) may be labeled with the text "report/export" 336 because the eighth area 312(8) may contain items, icons, or prompts for the user of the user interface 310 present a report or export the information to another program or location. Each text section 330, 332, 334, 336 contains a different level of shading, which may indicate the amount of time a user spent in those areas 312(1)-312(8) while completing the designated task. Thus, the text section 332 that is associated with the sixth area 312(6) may be darker than the text section 334 that is associated with the seventh area 312(7) because, as previously indicated for the illustrated example, the sixth area 312(6) was the most used area of the user interface 310 and the seventh area 312(7) was the least used area of the user interface 310. In other embodiments, the text sections 330, 332, 334, 336 may contain different colors of shading rather than the level of darkness of shading to further indicate usage.

Figure 4:
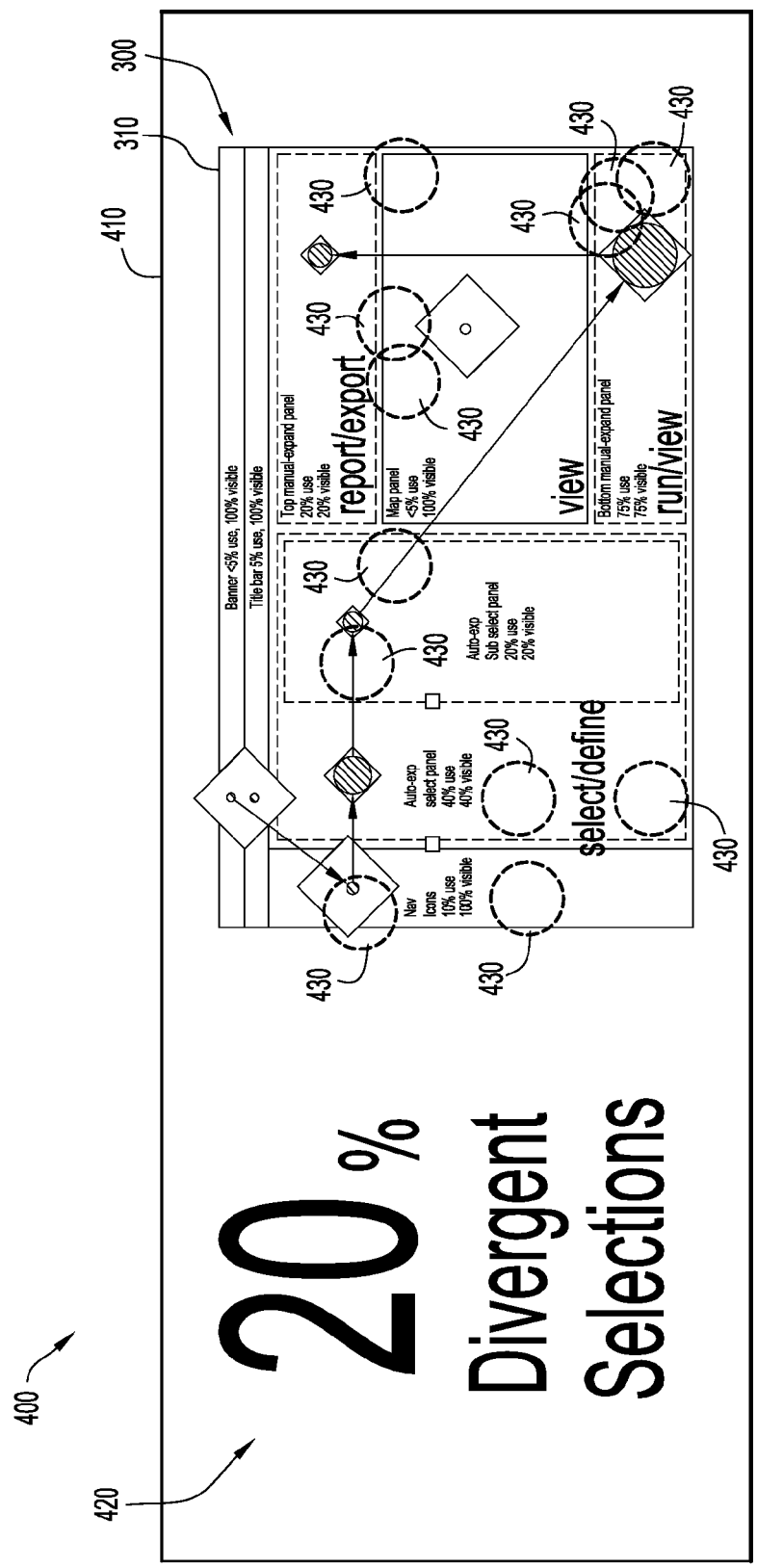
FIG. 4 is an example of a divergent evaluation diagram of a user interface that displays the areas or locations of a graphical user interface that test users clicked, selected, and/or hovered over that did not contribute to completion of the designated task in accordance with an embodiment of the present invention.

Turning to FIG. 4, illustrated is a divergent evaluation diagram 400. The divergent evaluation diagram 400 may include a display area 410 that may contain a view of the heuristic evaluation diagram 300 with the user interface 310 and a value 420 of the percentage of selections within the user interface 310 that did not contribute to the completion of the designated task. As illustrated in FIG. 4, the value 420 is disposed on the left side of the divergent evaluation diagram 400, while the heuristic evaluation diagram 300 is disposed on the right side of the divergent evaluation diagram 400. Moreover, the divergent evaluation diagram 400 may further include a plurality of rings 430 disposed in various locations on the user interface 310. The plurality of rings 430 may all be of equivalent size. Moreover, the plurality of rings 430 may be of a different color or shading than the circles 320(1)-320(8) of the areas 312(1)-312(8) of the user interface 310. The plurality of rings 430 represent the various locations where users clicked, selected, or hovered over the user interface 310, where the clicks or selections by the users did not contribute to the completion of the designated task. In the example illustrated in FIG. 4, there were twelve divergent selections 430 by users when completing the designated task with the user interface 310. Furthermore, as indicated by the value 420 on the left side of the divergent evaluation diagram 400, the twelve divergent selections 430 are 20% of the total number of selections in the user interface 310.

Figure 5:
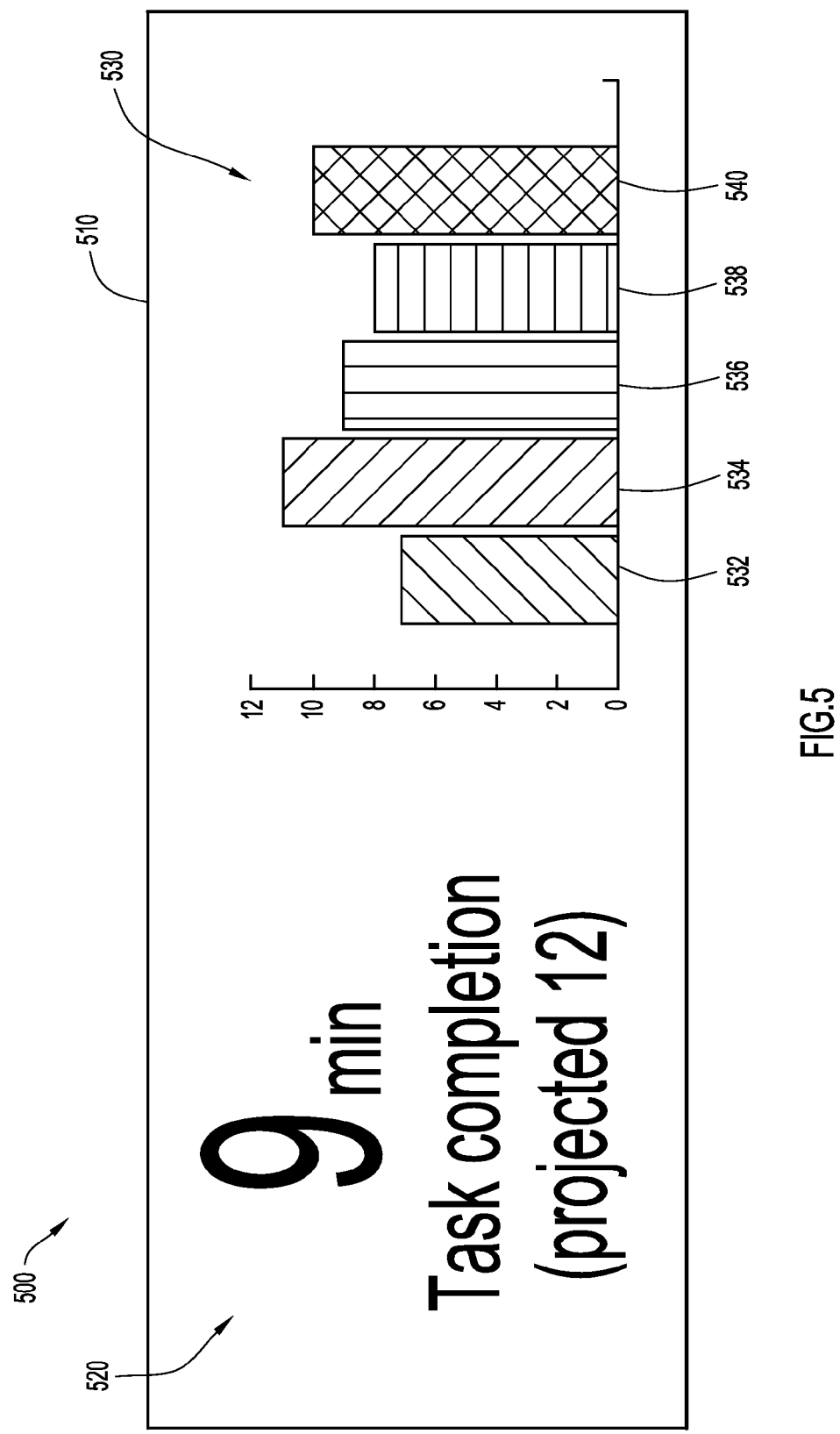
FIG. 5 is an example of an elapsed time evaluation diagram that displays the time for each test user evaluated, as well as the average time of all the evaluated test users, required to complete a task using the user interface illustrated in FIG. 3 according to an embodiment of the present invention.

Turning to FIG. 5, illustrated is an elapsed time evaluation diagram 500. The elapsed time evaluation diagram 500 may include a display area 510 that may contain a value 520 of the average time elapsed for the completion of the designated task with the user interface 310 and a graphical chart 530 of the time taken by each of the test users to complete the designated task. As illustrated in FIG. 5, the value 520 is disposed on the left side of the elapsed time evaluation diagram 500, while the graphical chart 530 is disposed on the right side of the elapsed time evaluation diagram 400. In the example illustrated in FIG. 5, the value 520 illustrates that the average time taken to complete the designated task with the user interface was 9 minutes and that the projected average time was 12 minutes. Thus, the test users completed the designated task with the user interface 310 under the projected time. Moreover, while the graphical chart 530 is illustrated as a bar graph, the graphical chart 530 could be any type of chart, such as a pie chart, line graph, scatter plot, etc., to convey the number of test users that completed the designated task with the user interface 310 and the amount of time taken by each test user to complete the designated task with the user interface 310. The graphical chart 530 illustrated in FIG. 5 displays five test users 532, 534, 536, 538, 540. As illustrated, the first test user 532 completed the designated task in 7 minutes, and the second user 534 completed the designated task in 11 minutes. Additionally, the third user 536 completed the designated task in 9 minutes, while the fourth user 538 completed the designated task in 8 minutes. The fifth user 540 completed the designated task in 10 minutes. When each of these times from each of the test users 532, 534, 536, 538, 540 are averaged, the average time equals 9 minutes, as displayed by the value 520 in the elapsed time evaluation diagram 500.

Figure 6:
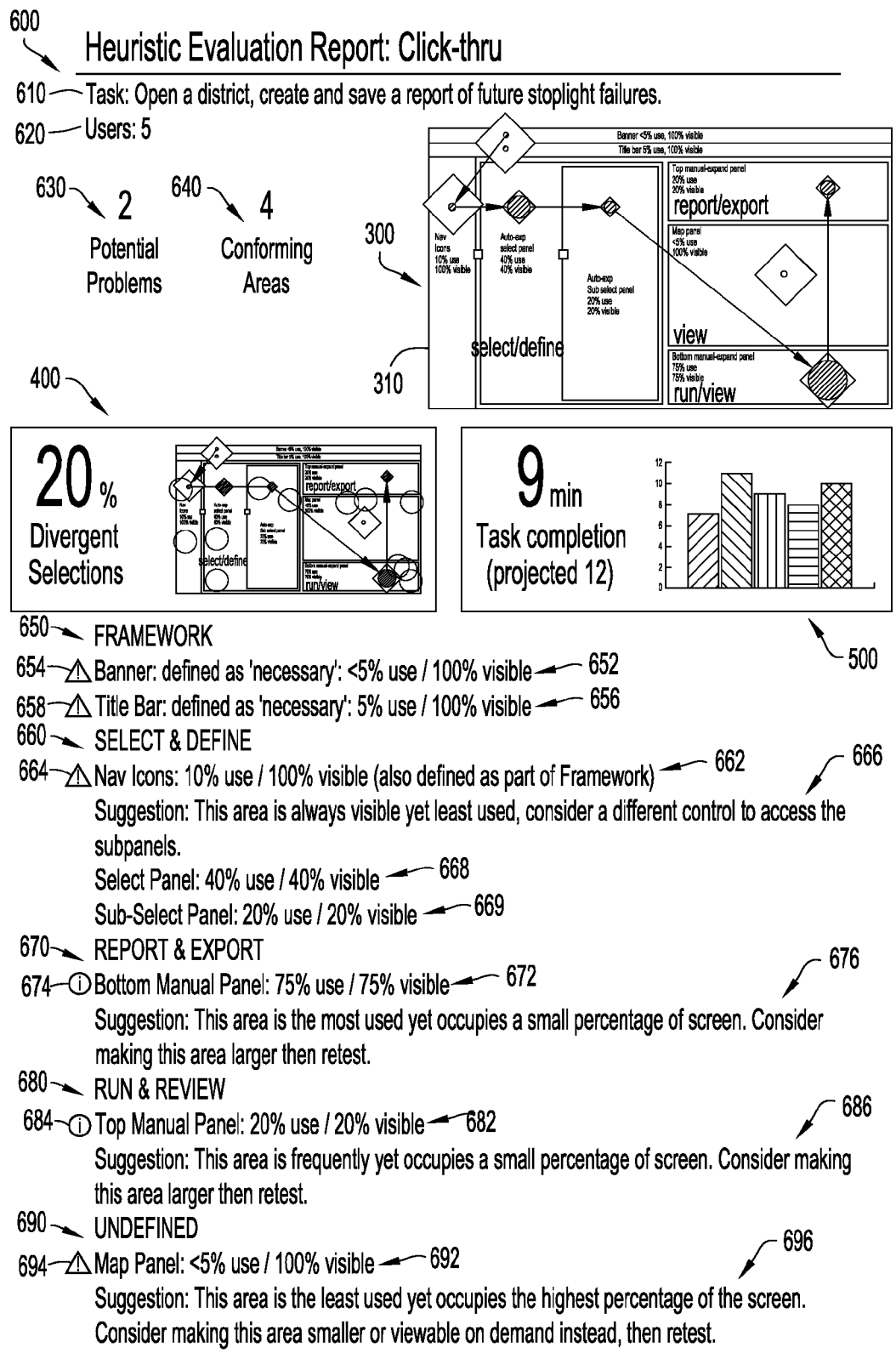
FIG. 6 is an example of a heuristic evaluation report that includes the heuristic evaluation for a user interface, the heuristic evaluation report including the heuristic evaluation diagram illustrated in FIG. 3, the divergent evaluation diagram illustrated in FIG. 4, and the elapsed time evaluation diagram illustrated in FIG. 5 according to an embodiment of the present invention.

Turning to FIG. 6, illustrated is an example of a heuristic evaluation report 600. The example of the heuristic evaluation report 600 includes the heuristic evaluation diagram 300 with the example of the user interface 310, the divergent evaluations diagram 400, and the elapsed time evaluation diagram 500. Proximate to the top of the heuristic evaluation report 600 is a designated task listing 610 that displays the designated task completed with the user interface 310. In the example illustrated in FIG. 6, the designated task listing 610 states that the designated task was to "open a district, create and save a report of future stoplight failures," Disposed directly below the designated task listing 610 is the number of test users listing 620 that states that number of test users that completed the designated task during the evaluation period. As illustrated, five (5) test users completed the designated task during the evaluation period. Further illustrated in FIG. 6, disposed below the number of test users listing 620 on the left side of the heuristic evaluation report 600 is a potential problems listing 630 and a conforming areas listing 640. As illustrated, the heuristic evaluation report 600 is indicating that the user interface 310 may contain 2 potential problems and may have 4 areas of the user interface 310 that conform to necessary standards. Disposed to the right of the potential problems listing 630 and the conforming areas listing 640 is the heuristic evaluation diagram 300 with a sample of the user interface 310.

FIG. 6 further illustrates that the heuristic evaluation report 600 displays the divergent evaluation diagram 400 and the elapsed time evaluation diagram 500 below the potential problems listing 630, the conforming areas listing 640, and the heuristic evaluation diagram 300. The divergent evaluation diagram 400 is disposed on the left side of the heuristic evaluation report 600 and the elapsed time evaluation diagram 500 is disposed on the right side of the heuristic evaluation report 600. Disposed below the divergent evaluation diagram 400 and the elapsed time evaluation diagram 500 is a series of text that is broken down into five categories 650, 660, 670, 680, 690. The first text category, or the "Framework" category, 650 includes a first listing 652 and a second listing 656. The first listing 652 represents the first area 312(1) of the user interface 310 entitled "Banner" 314(1). The first listing 652 also includes the first percentage 316(1) and the second percentage 318(1) for the first area 312(1), while also containing a warning icon 654. The second listing 656 represents the second area 312(2) of the user interface 310 entitled "Title Bar" 314(2). The second listing 656 also includes the first percentage 316(2) and the second percentage 318(2) for the second area 312(2), while also containing a warning icon 658. The warning icons 654, 658 may be displayed in the first and second listings 652, 656 because of the large discrepancies between the first and second percentages 316(1), 316(2), 318(1), 318(2) of the first and second areas 312(1), 312(2). Furthermore, the first and second listings 652, 656 each state that the first and second areas 312(1), 312(2) are "necessary" for the user interface 310, and thus, the heuristic evaluation report 600 did not provide "suggestions" for how to improve these areas 312(1), 312(2).

The second text category, or the "Select & Define" category, 660 includes a third listing 662, a fourth listing 668, and a fifth listing 669. The third listing 662 represents the third area 312(3) of the user interface 310 entitled "Nav Icons" 314(3). The third listing 662 also includes the first percentage 316(3) and the second percentage 318(3) for the third area 312(3), while also containing a warning icon 664. The warning icon 664 may be displayed because of the large discrepancies between the first and second percentages 316(3), 318(3) of the third area 312(3). The heuristic evaluation report 600 also includes a suggestion 666 for the third area 312(3) listed in the third listing 662. The suggestion 666 states that "This area is always visible yet least used, consider a different control to access the sub panels." The fourth and fifth listings 668, 669 represent the fourth and fifth areas 312(4), 312(5) of the user interface 310 entitled "Select Panel" 314(4) and "Sub-Select Panel" 314(5), respectively. The fourth and fifth listings 668, 669 also include the first percentages 316(4), 316(5) and the second percentages 318(4), 318(5) for the fourth and fifth areas 312(4), 312(5), respectively. Because the first percentages 316(4), 316(5) are substantially equal to the second percentages 318(4), 318(5) for the fourth and fifth areas 312(4), 312(5), the fourth and fifth listings 668, 669 do not have warning icons or suggestions on how to improve these areas 312(4), 312(5).

The third text category, or the "Report & Export" category, 670 includes a sixth listing 672. The sixth listing 672 represents the sixth area 312(6) of the user interface 310 entitled "Bottom Manual Panel" 314(6), where the sixth listing 672 also includes the first percentage 316(6) and the second percentage 318(6) for the sixth area 312(6). The sixth listing 672 further includes an information icon 674 that may be displayed because the sixth area 312(6) is frequently used within the user interface 310, but occupies a small percentage of the display of the user interface 310 and is not visible 100% of the time that the user interface 310 is being operated. The heuristic evaluation report 600 also includes a suggestion 676 for the sixth area 312(6) in the sixth listing 672. The suggestion 676 states that "This area is the most used yet occupies a small percentage of the screen. Considering making this area larger then retest."

The fourth text category, or the "Run & Review" category, 680 includes a seventh listing 682. The seventh listing 682 represents the eighth area 312(8) of the user interface 310 entitled "Top Manual Panel" 314(8), where the seventh listing 682 also includes the first percentage 316(8) and the second percentage 318(8) for the eighth area 312(8). The seventh listing 682 further includes an information icon 684 that may be displayed because the eighth area 312(8) is frequently used within the user interface 310, but occupies a small percentage of the display of the user interface 310 and is not visible 100% of the time that the user interface 310 is being operated. The heuristic evaluation report 600 also includes a suggestion 686 for the eighth area 312(8) in the seventh listing 682. The suggestion 686 states that "This area is frequently used yet occupies a small percentage of the screen. Considering making this area larger then retest."

The fifth text category, or the "Undefined" category, 690 includes an eighth listing 692. The eighth listing 692 represents the seventh area 312(7) of the user interface 310 entitled "Map Panel" 314(7), where the eighth listing 692 also includes the first percentage 316(7) and the second percentage 318(7) for the seventh area 312(7), while also containing a warning icon 694. The warning icon 694 may be displayed because of the large discrepancies between the first and second percentages 316(7), 318(7) of the seventh area 312(7). The heuristic evaluation report 600 also includes a suggestion 696 for the seventh area 312(7) listed in the eighth listing 692. The suggestion 696 states that "This area is the least used yet occupies the highest percentage of the screen. Consider making this area smaller or viewable on demand instead, then retest."

Thus, according to the heuristic evaluation report 600, the third area 312(3) and seventh area 312(7) are the two potential problems that were referenced in the potential problems listing 630. The suggestions 666, 676, 686, 696 created by the heuristic evaluation report 600 may provide a developer, programmer, or designer of the user interface 310 with the identity of the areas 312(3), 312(6), 312(7), 312(8) of the user interface 310 that may be changed, altered, or tweaked to improve the efficiency and effectiveness of the user interface 310 in completing the designated task. The suggestions 666, 676, 686, 696 created by the heuristic evaluation report 600 may further provide a developer, programmer, or designer with recommendations for how to improve the areas 312(3), 312(6), 312(7), 312(8) identified.

Figure 7:
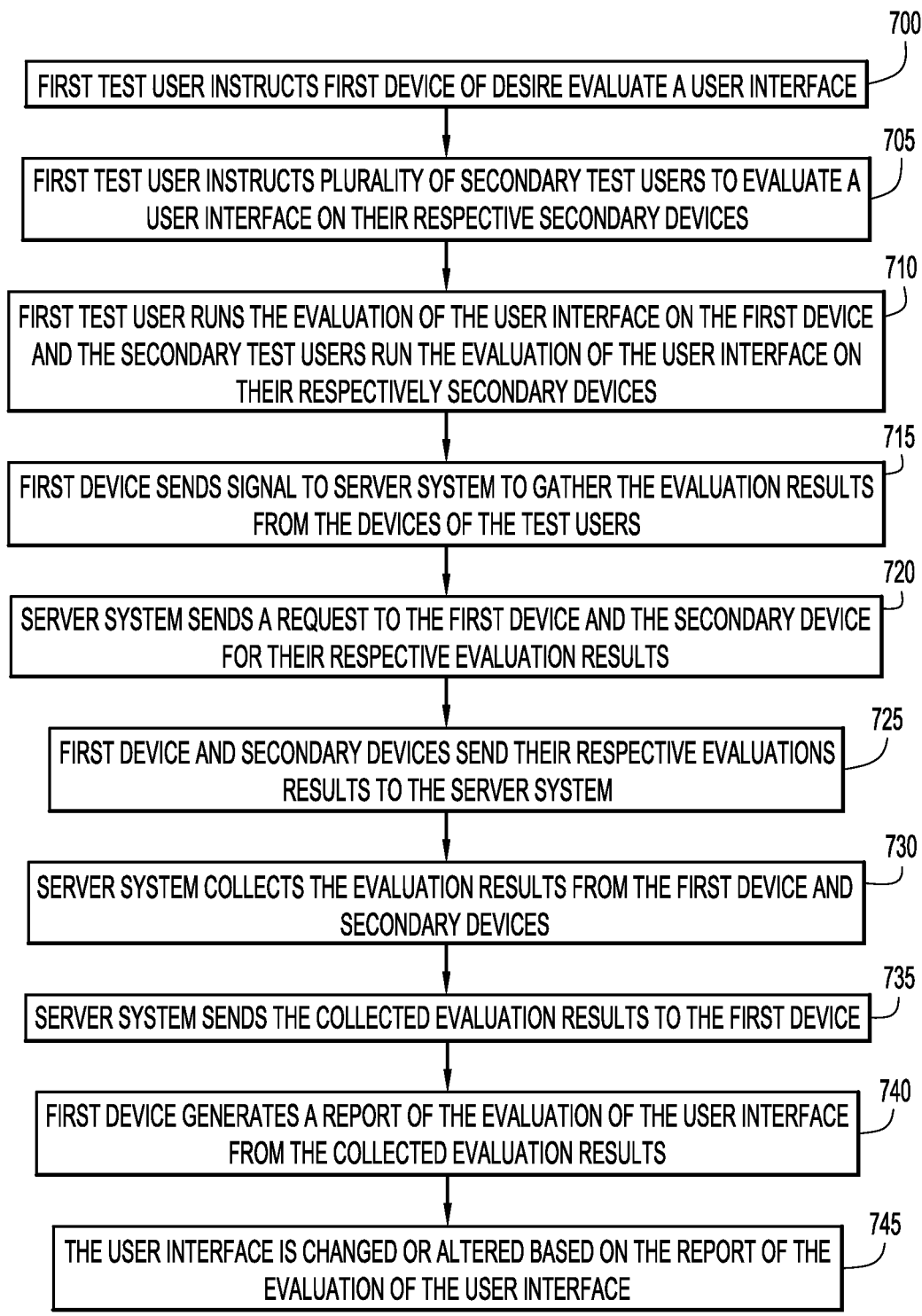
FIG. 7 is a procedural flow chart illustrating an example manner for evaluating a user interface according to an embodiment of the present invention.

Turning to FIG. 7, illustrated is a flow chart of the steps performed for evaluating a user interface by a plurality of test users. The flow chart illustrated in FIG. 7 may be performed by the multiple devices (e.g., server system 100 and client systems 140, 140') illustrated in FIG. 1 to operate the user interface evaluation modules 142, 142' to track and monitor a test user's interaction and use of a user interface to complete a designated task, and then operate the report generation modules 144, 144' to generate a report of the evaluation from the user interface evaluation modules 142, 142'. At block 700, a first test user instructs the first device (e.g., client system 140) that the test user wishes to evaluate a user interface. The user interface may be any type of user interface that may be installed on the client system 140, including graphical user interfaces. At block 705, the first test user instructs a plurality of secondary test users to evaluate the same user interface on their respective secondary devices (e.g., client system 140'), where the first test user may further instruct the plurality of secondary test users of a designated task to be completed with the user interface. At block 710, the first test user runs the evaluation of the user interface on the first device with the user interface evaluation module 142 and the secondary test users run the evaluation of the user interface on their respective secondary devices with the user interface evaluations modules 142'. The evaluation of the user interface may include tracking or monitoring the visibility and usage (e.g., amount of time each area of the user interface are visible, amount of use each area of the user interface, etc.) of each of the areas of the user interface, as well as the click flow path of the test users, as the test users utilize the user interface to complete the designated task. At block 715, the first device sends a signal to the server system (e.g., server system 100) to gather the evaluation results from the devices of the test users. At block 720, the server system sends a request to the first device and the secondary devices for their respective evaluation results. At block 725, the first device and the secondary devices send their respective evaluation results to the server system, in some embodiments, the devices may receive and send their respective evaluation results without interaction or permission from the test users. In other embodiments, the devices may receive a notification that the server system is requesting, the evaluation results for that respective device.

At block 730, the server system collects the evaluation results (e.g., amount of time each area of the user interface are visible, amount of use each area of the user interface, etc.) from the first device and the secondary devices. At block 735, the server system then sends the collected evaluation results to the first device. At block 740, using the report generation module 144, 144' the first device generates an evaluation report (illustrated in FIG. 6) for the user interface based on the collected evaluation results from each of the devices. The generated report may presents the discrepancies between the visibility and the usage of each of the areas of the user interface, as well as the click flow path of the test users, as shown in the heuristic evaluation diagram illustrated in FIG. 3. At block 745, the user interface may be changed or altered based on the generated report of the evaluation of the user interface for completing a designated task. This may be accomplished manually or automatically by the system.

Figure 8:
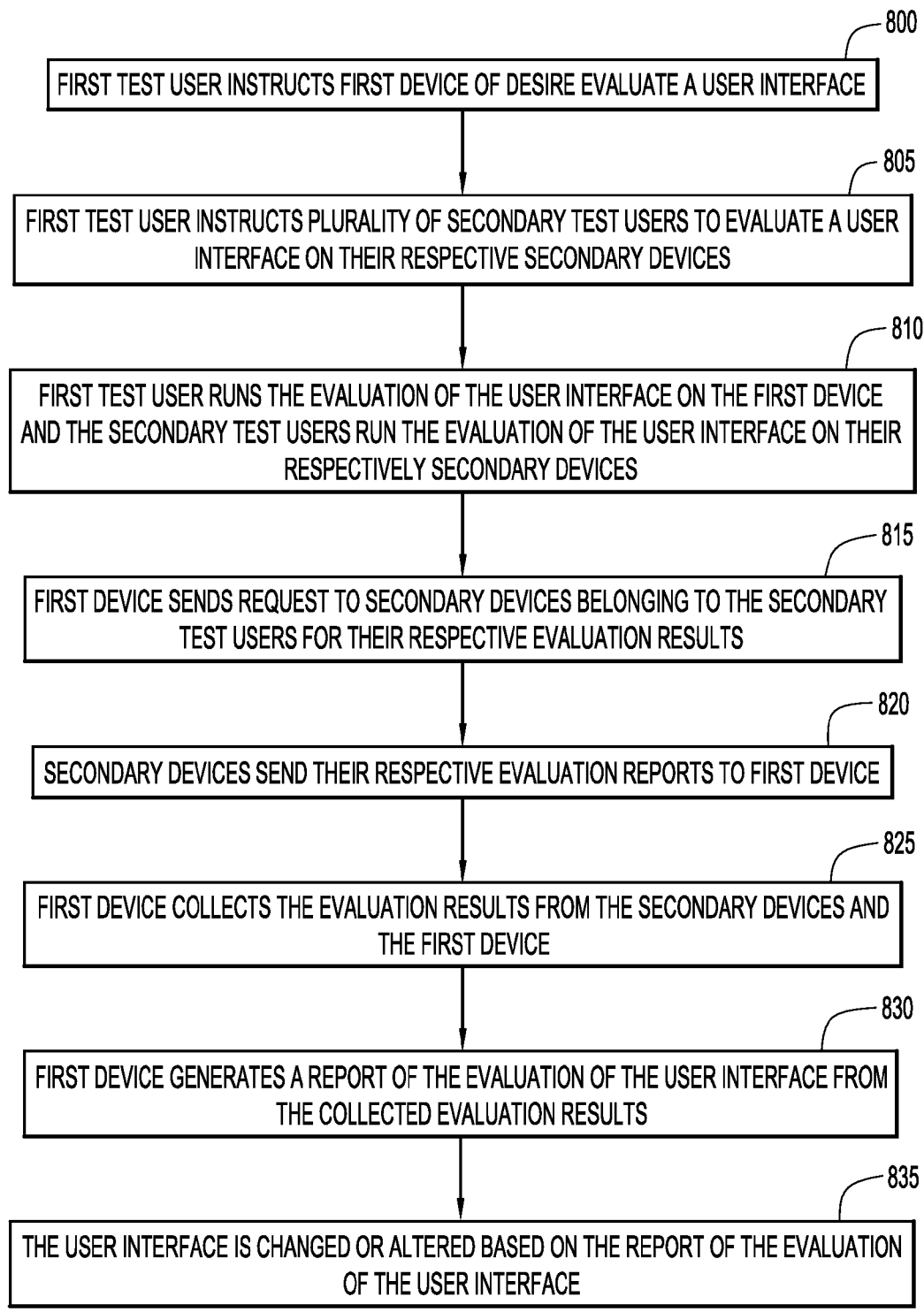
FIG. 8 is a procedural flow chart illustrating a second example of a manner for evaluating a user interface according to an embodiment of the present invention.

FIG. 8 is a flow chart of an alternative manner for evaluating a user interface by a plurality of test users. The flow chart of FIG. 8 may be performed by the multiple devices illustrated in FIG. 2 to operate the user interface evaluation modules 142, 142', 142", 142''' to track and monitor a test user's interaction and use of a user interface to complete a designated task, and then operate the report generation module 144 to generate a report of the evaluation from the user interface evaluation modules 142, 142', 142", 142'''. At block 800, a first test user instructs the first device (e.g., client system 140) that the test user wishes to evaluate a user interface. The user interface may be any type of user interface that may be installed on the client system 140, including graphical user interfaces. At block 805, the first test user instructs a plurality of secondary test users to evaluate the same user interface on their respective secondary devices (e.g., client system 140', 140", 140'''), where the first test user may further instruct the plurality of secondary test users of a designated task to be completed with the user interface. At block 810, the first test user runs the evaluation of the user interface on the first device and the secondary test users run the evaluation of the user interface on their respective secondary devices. The evaluation of the user interface may include tracking or monitoring the visibility and usage of each of the areas of the user interface, as well as the click flow path of the test users, as the test users utilize the user interface to complete the designated task. At block 815, the first device sends a request to the secondary devices for their respective evaluation results. At block 820, the secondary devices send their respective evaluation results to the first device. In some embodiments, the devices may receive and send their respective evaluation results without interaction or permission from the test users. In other embodiments, the devices may receive a notification that the first device is requesting the evaluation results for that respective device. At block 825, the first device collects the evaluation results (e.g., amount of time each area of the user interface are visible, amount of use each area of the user interface, the click flow path or navigation sequence, etc.) from the secondary devices and combines them with the results from the first device. At block 830, using the report generation module 144, the first device generates an evaluation report (illustrated in FIG. 6) for the user interface based on the collected evaluation results from each of the devices. The generated report may present the discrepancies between the visibility and the usage of each of the areas of the user interface, as well as the click flow path of the test users, as shown in the heuristic evaluation diagram illustrated in FIG. 3. At block 835, the user interface may be changed or altered based on the generated report of the evaluation of the user interface for completing a designated task. This may be accomplished manually or automatically by the system.

It will be appreciated that the embodiments described above and illustrated in the drawings represent only a few of the many ways of implementing embodiments for evaluating user interfaces for their efficiency and effectiveness in completing designated tasks.

The embodiments described above and illustrated in the drawings improve how user interfaces are evaluated to better enable designers and developers of user interfaces to understand how the user interfaces are utilized by end users in completing tasks. The embodiments described above may continuously monitor and track user interfaces for the completion of multiple tasks and may automatically send the evaluation results to a server or other client device that generates evaluation reports. The system may automatically run evaluations of user interfaces to provide designers and developers of user interfaces with updated information on how to improve their user interfaces to better serve the end users in completing tasks. The embodiments described above streamline the development of user interfaces.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, user interface evaluation module, evaluation collection module, report generating module, etc.). These systems may include any types of monitors and input devices (e.g., keyboard, mouse, voice recognition, etc.) to enter and/or view information.

It is to be understood that the software (e.g., user interface evaluation module, evaluation collection module, report generating module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., user interface evaluation module, evaluation collection module, report generating module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., user profiles, user interface area visibility amounts, user interface area usage amounts, user interface click flow path, number of test users, etc.). The database system may be implemented by any number of any conventional or other databases, data stores or storage structures (e.g., files, databases, data structures, data or other repositories, etc.) to store information (e.g., user profiles, user interface area visibility amounts, user interface area usage amounts, user interface click flow path, number of test users, etc.). The database system may be included within or coupled to the server and/or client systems. The database systems and/or storage structures may be remote from or local to the computer or other processing systems, and may store any desired data (e.g., user profiles, user interface area visibility amounts, user interface area usage amounts, user interface click flow path, number of test users, etc.).

The present invention embodiments may employ any number of any type of user interface (e.g., Graphical User Interface (GUI), command-line prompt, etc.) for obtaining or providing information (e.g., user profiles, user interface area visibility amounts, user interface area usage amounts, user interface click flow path, number of test users, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, profile scores, user interface area visibility amounts, user interface area usage amounts, user interface click flow path, number of test users, etc.).

The present invention embodiments are not limited to the specific tasks or algorithms described above, but may be utilized for determining an option for any activity between the participants by analyzing the preferences, limitations, and capabilities of each of the participants.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of tracking and presenting states of a user interface comprising:
   tracking visibility and usage of each of a plurality of areas of a user interface;
   determining the visibility as a first percentage of time each area of the plurality of areas is visible;
   determining the usage as a second percentage of time each area of the plurality of areas is in use;
   determining one or more navigation sequences through the plurality of areas based on usage of the user interface; and
   graphically presenting the visibility, usage, and determined navigation sequences on a display including a layout of the user interface, wherein the visibility of each of the plurality of areas are represented by a first shape disposed over each represented area, the usage of each of the plurality of areas are represented by a second shape disposed within the first shape for each represented area, the second shape differing from the first shape, and the determined navigation sequences are displayed as connections between each of the plurality of first shapes disposed over the navigated through areas.

2. The method of claim 1, wherein the layout of the user interface includes the plurality of areas, and graphically presenting comprises:
   displaying the visibility and usage of the plurality of areas within corresponding areas of the layout.

3. The method of claim 2, wherein displaying the visibility and usage comprises:
   determining the visibility as an amount of time each corresponding area is visible; and
   determining the usage as an amount of time each corresponding area is in use.

4. The method of claim 1, further comprising generating reports that present the visibility amount for each corresponding area, the usage amount for each corresponding area, the connections between the graphical objects, and suggestions on how to improve the user interface.

5. The method of claim 1, wherein the plurality of areas of the user interface include a banner, a title, and one or more panels.

6. The method of claim 1, wherein a size of each first shape is based on a value of the first percentage and a size of each second shape is based on a value of the second percentage.

7. A system for conducting an activity among a plurality of participants comprising:
    at least one processor configured to:
    track visibility and usage of each of a plurality of areas of a user interface;
    determine the visibility as a first percentage of time each area of the plurality of areas is visible;
    determine the usage as a second percentage of time each area of the plurality of areas is in use;
    determine one or more navigation sequences through the plurality of areas based on usage of the user interface; and
    graphically present the visibility, usage, and determined navigation sequences on a display including a layout of the user interface, wherein the visibility of each of the plurality of areas are represented by a first shape disposed over each represented area, the usage of each of the plurality of areas are represented by a second shape disposed within the first shape for each represented area, the second shape differing from the first shape, and the determined navigation sequences are displayed as connections between each of the plurality of first shapes disposed over the navigated through areas.

8. The system of claim 7, wherein the layout of the user interface includes the plurality of areas, and where graphically presenting further comprises:
    displaying the visibility and usage of the plurality of areas within corresponding areas of the layout.

9. The system of claim 8, wherein displaying the visibility and usage further comprises:
    determining the visibility as an amount of time each corresponding area is visible; and
    determining the usage as an amount of time each corresponding area is in use.

10. The system of claim 7, wherein the processor is further configured to:
    generate reports that present the visibility amount for each corresponding area, the usage amount for each corresponding area, the connections between the graphical objects, and suggestions on how to improve the user interface.

11. The system of claim 7, wherein the plurality of areas of the user interface include a banner, a title, and one or more panels.

12. The apparatus of claim 7, wherein a size of each first shape is based on a value of the first percentage and a size of each second shape is based on a value of the second percentage.

13. A computer program product for tracking and presenting states of a user interface comprising:
    a computer readable storage medium having program instructions embodied therewith, the program instructions executable by a processor to cause the processor to:
    track visibility and usage of each of a plurality of areas of a user interface;
    determine the visibility as a first percentage of time each area of the plurality of areas is visible;
    determine the usage as a second percentage of time each area of the plurality of areas is in use;
    determine one or more navigation sequences through the plurality of areas based on usage of the user interface; and
    graphically present the visibility, usage, and determined navigation sequences on a display including a layout of the user interface, wherein the visibility of each of the plurality of areas are represented by a first shape disposed over each represented area, the usage of each of the plurality of areas are represented by a second shape disposed within the first shape for each represented area, the second shape differing from the first shape, and the determined navigation sequences are displayed as connections between each of the plurality of first shapes disposed over the navigated through areas.

14. The computer program product of claim 13, wherein the layout of the user interface includes the plurality of areas, and graphically presenting further comprises:
    displaying the visibility and usage of the plurality of areas within corresponding areas of the layout.

15. The computer program product of claim 14, wherein displaying the visibility and usage further comprises:
    determining the visibility as an amount of time each corresponding area is visible; and
    determining the usage as an amount of time each corresponding area is in use.

16. The computer program product of claim 13, wherein the plurality of areas of the user interface include a banner, a title, and one or more panels.

17. The computer program product of claim 13, wherein a size of each first shape is based on a value of the first percentage and a size of each second shape is based on a value of the second percentage.

\* \* \* \* \*